March 19, 1957 F. ROTTMANN 2,785,927
TRACTION INCREASING DEVICE FOR VEHICLE WHEELS
Filed April 6, 1953 5 Sheets-Sheet 1

INVENTOR.
FRED ROTTMANN
BY
ATTORNEYS

INVENTOR.
FRED ROTTMANN
BY
ATTORNEYS

March 19, 1957  F. ROTTMANN  2,785,927
TRACTION INCREASING DEVICE FOR VEHICLE WHEELS
Filed April 6, 1953  5 Sheets-Sheet 4

INVENTOR.
FRED ROTTMANN
BY
ATTORNEYS

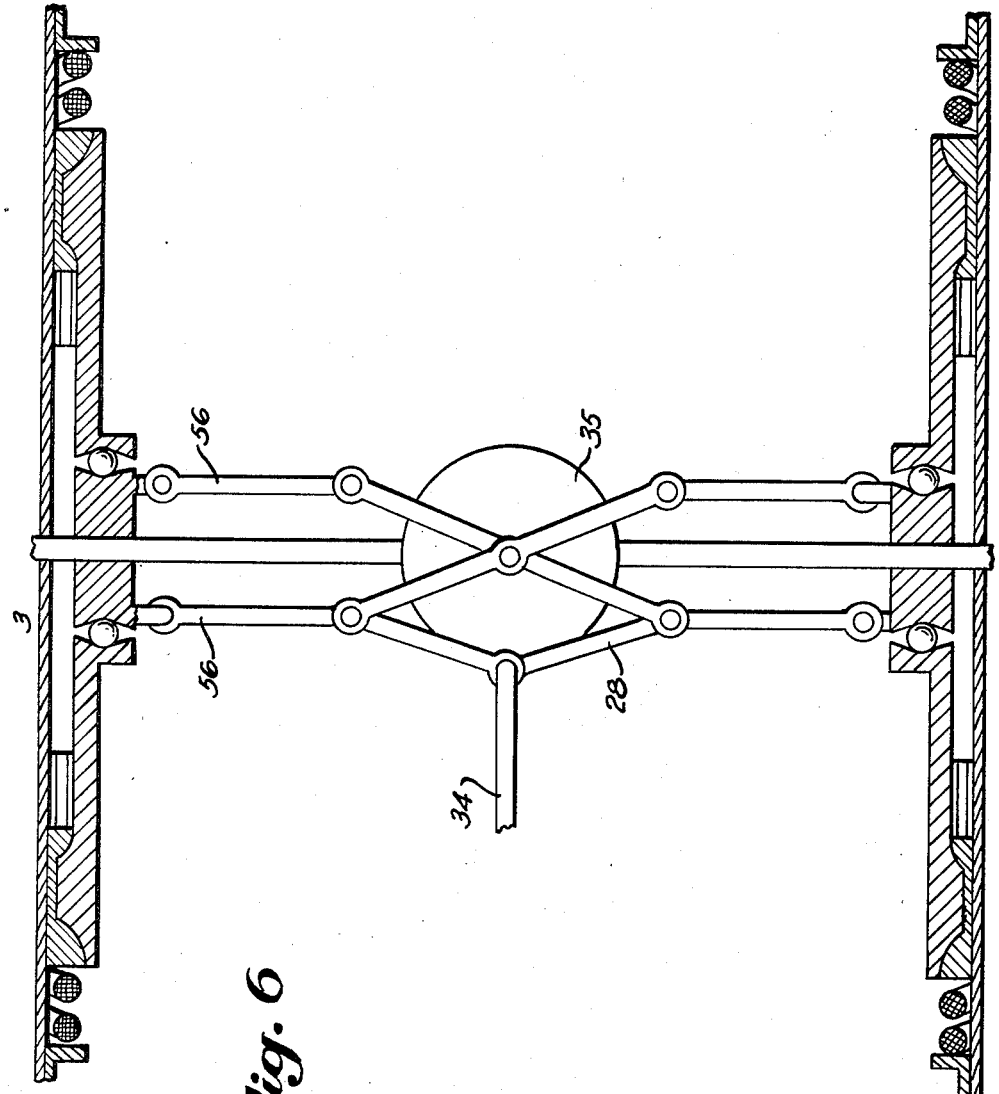

United States Patent Office 2,785,927
Patented Mar. 19, 1957

2,785,927
TRACTION INCREASING DEVICE FOR VEHICLE WHEELS

Fred Rottmann, Idstein (Taunus), Germany, assignor to Bernhard J. E. Meyer and Julia Meyer, Brooklyn, N. Y.

Application April 6, 1953, Serial No. 346,894

5 Claims. (Cl. 301—47)

This invention relates to a device for providing a radial shifting and a simultaneous axial rotation of shaft driven members.

An object of the present invention is the provision of a comparatively simple and effectively operating device through the use of which radially movable members may be shifted by sliding in slits formed in a cone-like body.

Another object of the present invention is the provision of a device which facilitates the above described double movement and also provides means preventing the locking or jamming of adjustable members in their slits in the course of the rotary movement.

Yet another object is the provision of a device of the described type which can be conveniently applied to a vehicle in order to improve and facilitate the gripping engagement of the wheels of the vehicles with the ground and also to improve the adjustability of the wheels to the locality over which they pass.

Other objects of the present invention will become apparent in the course of the following specification.

In accomplishing the objects of the present invention, it was found advisable to provide a cone-like drum which is movable axially in relation to a wheel of a vehicle and which comprises rack-like toothed elements engaged by pinions provided upon the inner ends of the movable members which are located close to the hub. Due to this arrangement, in the course of the axial shifting of the cone-like drum, the members are moved radially while rotating about their own axes. The axial movement of the drum may be carried out by means of a suitable toggle lever mechanism operated by a hand lever.

The invention will appear more clearly from the following detailed description when taken in connection with the accompanying drawings, showing by way of example preferred embodiments of the inventive idea.

In the drawings:

Figure 6 is similar to Figure 5 and shows the device of Figure 5 in a different position.

Figure 1:
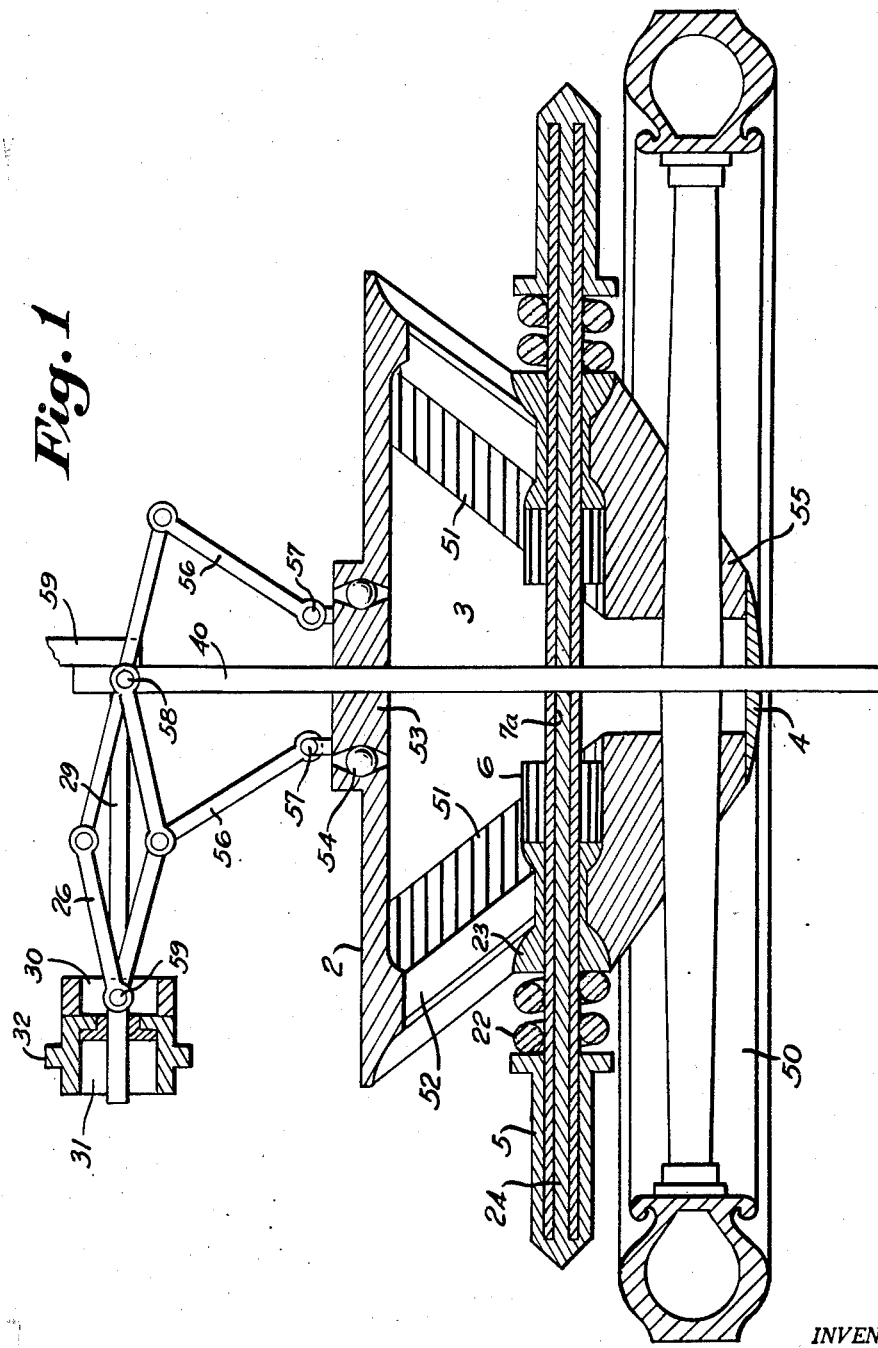
Figure 1 is a section through a device constructed in accordance with the principles of the present invention showing the gripping members in an inoperative position.
Figure 2:
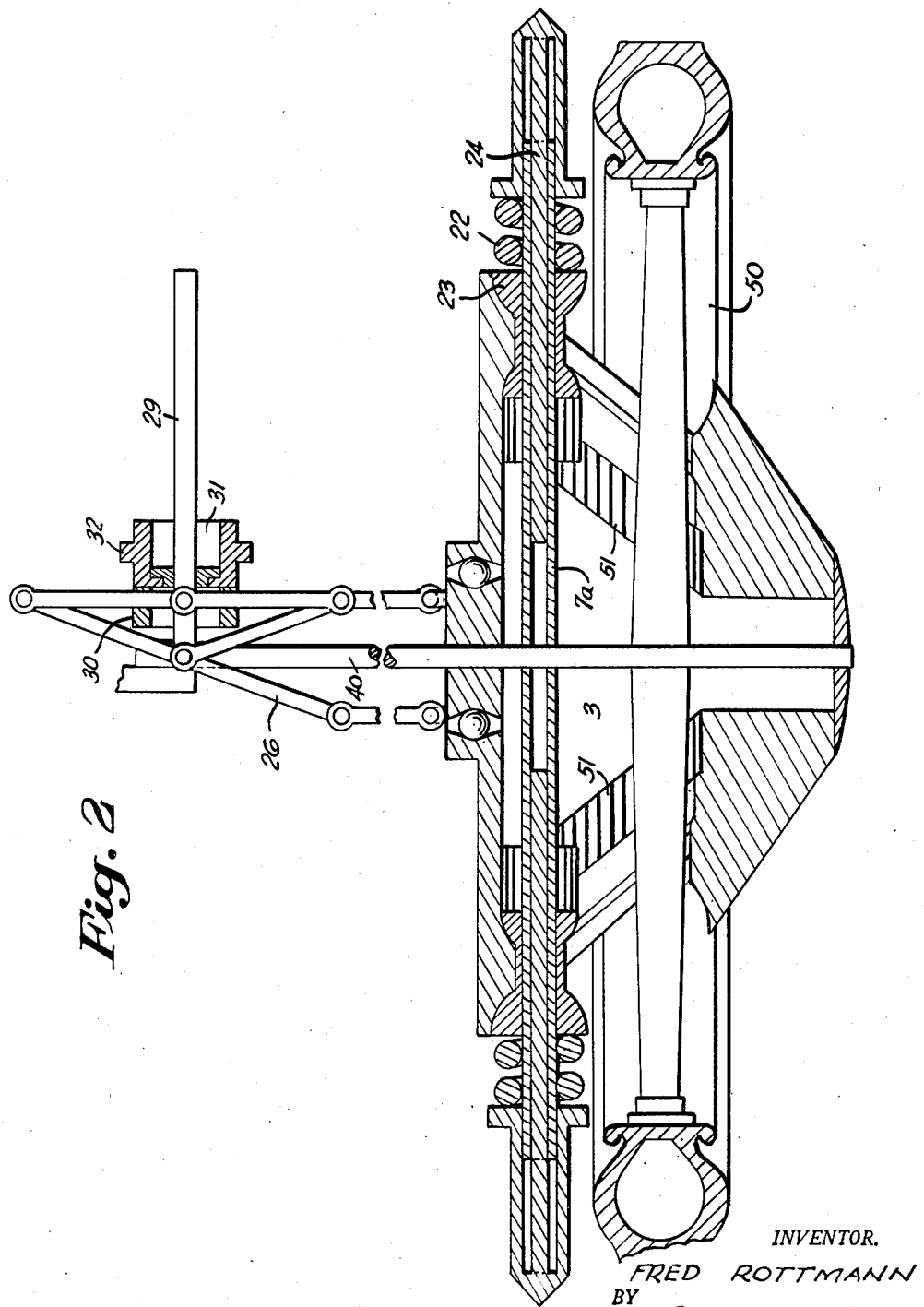
Figure 2 is similar to Figure 1 and illustrates the gripping members in a position in which they project beyond the circumference of the wheel.

The device shown in Figures 1 to 4 of the drawings includes a wheel 50 of a vehicle which may be of the usual construction and which is shown diagrammatically in Figures 1 and 2. The device for preventing the sliding or skidding of the vehicle and for arresting its movement includes a cone-like drum 3 which is shown in section in Figures 1 and 2. Figure 2 illustrates the drum 3 from the opposite direction to that of Figure 1.

The drum 3 is hollow and its inner walls carry racks 51 which are firmly mounted in these walls. The racks 51 mesh with pinions 6, a separate pinion being provided for each rack. It is apparent that the number of the racks and the pinions may be varied at will and that this number is equal to that of the spokes 5.

The pinions 6 are integral with sleeves 23 which fit in the slits 52 formed in the drum 3. The sleeves 23 have flanged-shaped outer portions extending beyond the periphery of the cone-shaped drum 3. Springs 22 engage the ends of the members 23 and the flanged ends of the spokes 5. The spokes 5 are mounted upon tubular members 7a whose inner ends engage the shaft 40. The spokes 5 may be integral with the rods 24, extending through the tubes 7a.

The cone-shaped drum 3 has a cover 2 which may be integral therewith and which has a central opening containing a disk 53. Ball bearings 54 are located between the disk 53 and the cover 2.

A hub 4 is mounted upon the portion 55 of the casing 3 which is located close to the wheel 50.

The mechanism used for the axial movement of the drum 3 includes two levers 56 which are pivoted at 57 to the disk 53. The levers 56 are connected with a toggle lever system 26, consisting of a plurality of levers, some of which are pivoted at 58 to a supporting member 59 located adjacent the shaft 40. The toggle leverage 26 extends between the pivot 58 and another pivot 59 which is connected with a ring 30. The ring 30 is firmly connected with a ring 31 provided with a flange 32. The rings 30 and 31 are slidable upon a rod 29. This arrangement is illustrated in Figures 1 and 2.

Figure 3:
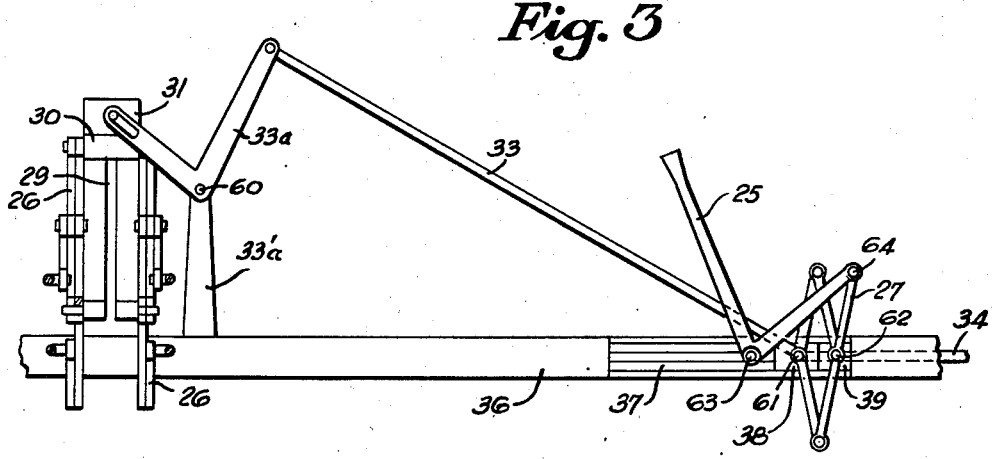
Figure 3 illustrates a mechanism for shifting the drum axially.
Figure 4:
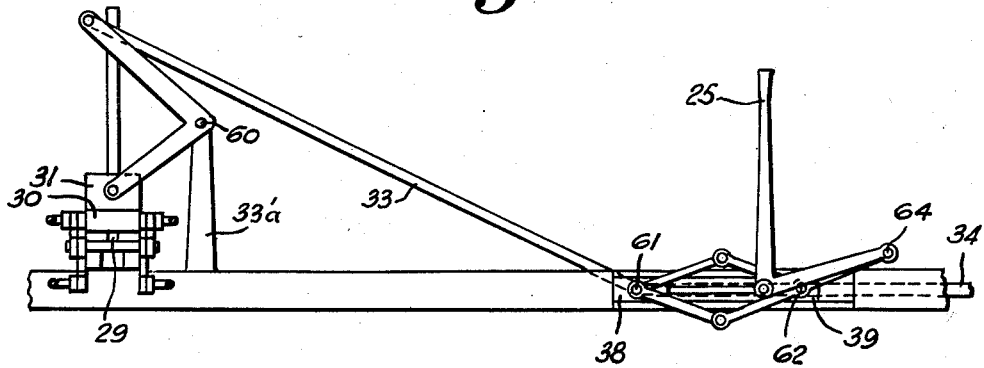
Figure 4 is similar to Figure 3 and illustrates the mechanism in a different position.

As shown in Figures 3 and 4, an angular lever 33a is connected with a ring 31 in such manner that the lever 33a can move the ring 31 up and down upon the rod 29. The lever 33a is pivoted at 60 upon a support 33'a connected to a member 36.

The lever 33a is connected with one end of a rod 33, the opposite end of which is connected at 61 to a system of toggle levers 27. The leverage 27 includes a pivot 62 which is mounted upon a slide 39. The pivot 61 is mounted upon a similar slide 38. The slides 38 and 39 are slidable upon a rail 37 which is connected with the frame element 36. The stability of the entire device is furthered by the double arrangement of the parts with the exception of the hand lever 25, which is pivoted at 63 and which is connected at 64 with the toggle leverage 27.

It is apparent from Figures 1 to 4 that when the hand lever 25 will be moved from the position shown in Figure 3 to the position shown in Figure 4, the slides 38 and 39 will be moved away from each other and the lever 33a will swing downwardly, thereby moving the rings 30 and 31 from the position shown in Figure 1 to the position shown in Figure 2. Then, the toggle leverage 26 will be actuated and the levers 56 will push the cone-shaped drum 3 toward the wheel 50 until the drum 3 will assume the position shown in Figure 2. In the course of this movement, the pinions 6 will be rotated by the racks 51 and this movement will be transmitted by the sleeves 21 and the springs 22 to the spokes 5. At the same time the spokes 5 will move outwardly beyond the outer periphery of the wheel 50, thereby providing firm engagement with the ground. It is apparent that the wheel 50 is the front wheel of a vehicle which will rotate either by rolling upon the ground or by a special drive (not shown). The drum 3 rotates along with the wheel 50 and the tubular members 7a rotate along with the drum 3. The movement of the spokes 5 beyond the wheel 50 will not necessarily stop the wheel but will increase its gripping faculty.

Figure 5:
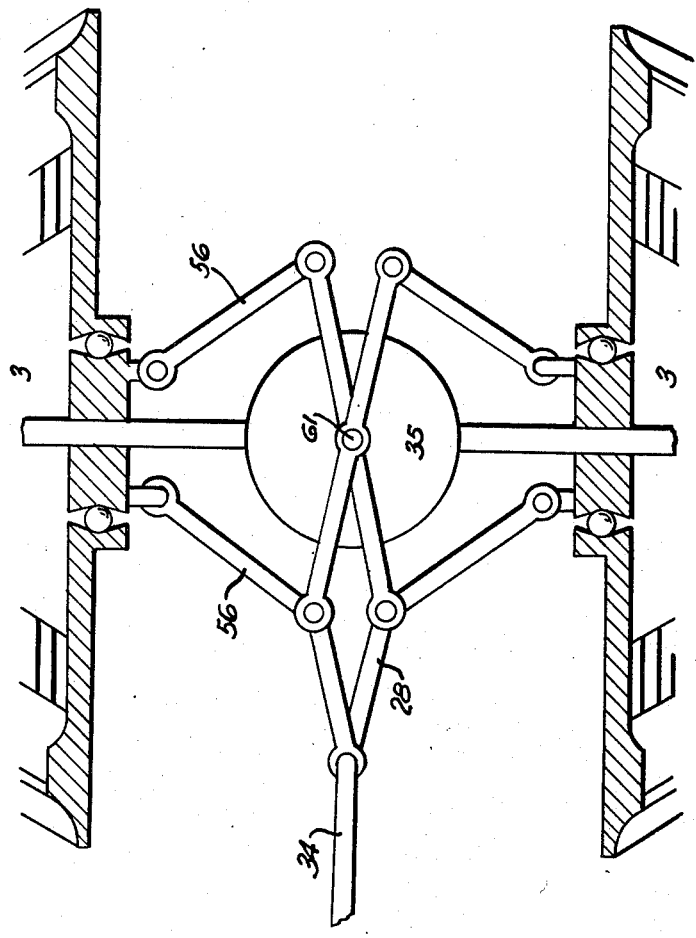
Figure 5 illustrates a somewhat different construction in section.

In the modification shown in Figures 5 and 6 the levers 56 of the two cone-shaped drums 3 are connected with a system of toggle levers 28 which is connected to a lever 34. It is apparent that the toggle leverage 28, when actuated by the lever 34, will operate the levers 56 and will then move the drums 3 toward or away from each other. The pivot 61 of the toggle leverage 28 is arranged in the middle of a differential drive 35 which is illustrated diagrammatically in Figs. 5 and 6. In other respects this construction may be the same as that shown in Figures 1 to 4.

It is apparent that the illustrations shown above have been given solely by way of illustration and not by way of limitation, and that they are subject to various modifications without exceeding the scope of the present invention. All such modifications are to be included within the scope of the present invention.

What is claimed is:

1. A device for radially shifting and rotating driven elements, said device comprising a rotary hollow casing, means supporting said casing for axial movement, said casing having slits formed therein, racks located within said casing and extending adjacent said slits, pinions meshing with said racks, tubular spokes carrying said pinions and having outer ends projecting through said slits, tubular members mounted upon said outer ends and movable upon said spokes, flanged sleeves connected with said pinions, springs between said tubular members and said flanged sleeves, and rods connected with said tubular members and extending into said spokes.

2. A device for radially shifting and rotating driven elements, said device comprising a rotary hollow casing, means supporting said casing for axial movement, said casing having slits formed therein, racks located within said casing and extending adjacent said slits, pinions meshing with said racks, spoke-shaped means carrying said pinions and having inner, interconnected ends located within said casing and outer ends projecting through said slits, and a toggle lever mechanism connected with said casing for axially moving the casing, whereby said racks will actuate said pinions to project said outer ends.

3. A device for radially shifting and rotating driven elements, said device comprising a rotary hollow casing, means supporting said casing for axial movement, said casing having slits formed therein, racks located within said casing and extending adjacent said slits, pinions meshing with said racks, spoke-shaped means carrying said pinions and having inner, interconnected ends located within said casing and outer ends projecting through said slits, a toggle lever mechanism connected with said casing for axially moving the casing, a shaft extending perpendicularly to the axis of rotation of said casing, a ring operatively connected with said toggle lever mechanism and movable upon said shaft, a hand-operated lever, and means operatively connecting said lever with said ring for moving said ring to move said casing whereby said racks will actuate said pinions to project said outer ends.

4. A gripping device for a vehicle wheel, comprising a casing having inner walls of substantially frusto-conical shape, racks mounted upon said walls and having longitudinal axes converging substantially in a point upon the longitudinal axis of said casing, the teeth of said racks extending parallel to the longitudinal axis of the casing, pinions meshing with said racks, means moving said casing relatively to said pinions and to the vehicle wheel in the directions of the longitudinal axis of the casing, whereby said pinions turn and move radially during said movement of the casing, said casing having slots formed therein, and elongated means extending through said slots and having radially extending spoke-shaped outer ends, the last-mentioned means being operatively connected with said pinions and movable therewith from an inoperative position to a position in which said spoke-shaped outer ends extend beyond the vehicle wheel, and vice versa.

5. A gripping device in accordance with claim 4, wherein the means moving said casing comprise two levers having ends pivoted to said casing, a toggle lever system pivotally connected with the other ends of said levers, a supporting pivot carrying said toggle lever system, a hand-operated lever, and means operatively connecting said hand-operated lever with said toggle lever system for actuating the same.

References Cited in the file of this patent

UNITED STATES PATENTS

| 1,396,556 | Carlson | Nov. 8, 1921 |
| 2,221,838 | Kane | Nov. 19, 1940 |

FOREIGN PATENTS

| 474,952 | Great Britain | Nov. 10, 1937 |